United States Patent Office 3,631,129
Patented Dec. 28, 1971

3,631,129
METHOD OF PREPARING INORGANIC POLYMERS
Piero Luigi Nannelli, King of Prussia, and Hyman David Gillman, Norristown, Pa., assignors to Pennwalt Corporation, Philadelphia, Pa.
No Drawing. Filed Apr. 7, 1970, Ser. No. 26,394
Int. Cl. C08g 33/16, 33/20
U.S. Cl. 260—2 P  5 Claims

ABSTRACT OF THE DISCLOSURE

Chromium(III) hydroxyaquo bis(phosphinate) polymers composed of the recurring unit $$[Cr(H_2O)(OH)(OPR_1R_2O)_2]$$

where $R_1$ and $R_2$ are inert organic groups, are prepared by reacting chromium(III) hydroxide with substituted phosphinic acids in aqueous medium. The polymers are used as coatings which will be subjected to high temperature environment.

---

This invention relates to an improved method of preparing certain inorganic polymers and more particularly relates to the preparation of chromium(III) phosphinate polymers by the reaction of chromium(III) hydroxide with substituted phosphinic acid in aqueous media.

U.S. Pat. No. 3,275,574, issued Sept. 27, 1966, Anthony J. Saraceno, describes and claims certain coordination polymers, which are completely inorganic in their backbone, have unexpectedly high temperature stability, and are useful for fabricated articles and as coatings useful in high temperature environments. Among the polymers described in the patent are hydroxyaquo metal phosphinate and arsinate polymers. The method disclosed in the patent for preparing these polymers involves a quite cumbersome two step procedure whereby a divalent metal phosphinate or arsinate is first prepared, and this material is oxidized in the presence of a neutral and a univalent ligand to yield the product polymer. The oxidation step results in a heterogeneous system and the product obtained is somewhat difficult to purify. U.S. Pat. No. 3,444,103, May 13, 1969, Keith Dean Maguire, describes an improvement over the foregoing original method whereby a more desirable product is obtained by carrying out the oxidation step in a manner that results in the polymer product being in homogeneous solution, wherein the reactants are dispersed in a solution consisting essentially of water and a neutral, water-miscible organic solvent, the proportion of water and organic liquid being adjusted to maintain the polymer product in solution, and after said oxidation is completed, diluting the solution with water to precipitate the polymer and thereafter separating said polymer from the liquid phase.

The method of the present invention provides an improved, simpler, more economical technique for producing the phosphorus-containing polymers described in the foregoing patents, having molecular weights ranging from about 2000 to about 100,000. In accordance with this invention, a method is provided for preparing chromium (III) hydroxyaquo bis(phosphinate) polymers of the recurring unit having the general formula $$[Cr(H_2O)(OH)(OPR_1R_2O)_2]$$

where $R_1$ and $R_2$ are inert organic groups, which may be the same or different, such as alkyl, aryl, alkoxy or aryloxy, preferably a hydrocarbon alkyl or aryl group containing from 1 to 10 carbon atoms, wherein chromium(III) hydroxide is reacted with substituted phosphinic acid of the formula $R_1R_2P(O)OH$, in aqueous medium or in a medium comprising a mixture of water and tetrahydrofuran. It has been found that the preferred proportion of solvents for this latter system is about 50 to 90% tetrahydrofuran and correspondingly from 50 to 10% water by volume.

Surprisingly, the method of this invention is not suitable for preparing the analogous chromium(III) hydroxyaquo bis(arsinate) polymer, that is, by reacting chromium hydroxide with substituted arsinic acid, because this particular reaction does not proceed to any significant extent.

In carrying out the process of this invention, one equivalent of chromium(III) hydroxide is reacted with two equivalents of the substituted phosphinic acid dissolved in the reaction solvent medium, approximately 100 parts by weight of solvent per from 0.5 part to about 10 parts of $Cr(OH)_3$. The polymerization reaction is carried out at temperatures within the range of about 50° C. to about 100° C. with from about 30 to 90 minutes of reaction time being adequate to obtain polymer yields on the order of 95% or more. The polymer is recovered by evaporation of the reaction medium, or in that case when tetrahydrofuran is present therein, excess water may be added and then the tetrahydrofuran is boiled off causing the polymer product to precipitate. The product may be air-dried at room temperature.

The polymerization reaction may be graphically illustrated by the following equation showing the production of a repeat unit by the reaction of chromium(III) hydroxide and substituted phosphinic acid:

$$Cr(OH)_3 + 2R_1R_2P(O)OH \rightarrow [Cr(H_2O)(OH)(OPR_1R_2O)_2] + H_2O$$

where $R_1$ and $R_2$ are the inert organic groups. Thus, an important advantage of the method of this invention is the fact that the only by-product of the polymerization reaction is water.

The following representation examples illustarte the improved method of this invention for preparing the described, known inorganic polymers.

EXAMPLE 1

Chromium(III) hydroxide is prepared as follows: A solution of 2.66 g. of $CrCl_3 \cdot 6H_2O$ (0.01 mole) in 100 ml. of water is treated with 35 ml. of one normal $NH_4OH$ solution. After stirring for about 10 minutes, the $Cr(OH)_3$ precipitate is collected on filter paper and washed with 50 ml. of water. The filter paper with the precipitate is transferred into a solution containing 5.80 g. of $$(C_8H_{17})_2P(O)OH$$

(0.02 mole) in 25 ml. of water and 120 ml. of tetrahydrofuran. The mixture is heated to boiling with stirring, and the hydroxide slowly dissolves. After the solution is boiled for about half an hour, it is filtered to remove the filter paper and then evaporated to give 6.55 g. or a 98.5% yield of polymer composed of the repeating unit $$[Cr(H_2O)(OH)(OP(C_8H_{17})_2O)_2]$$

The polymer structure is confirmed by elemental and infrared spectrum analyses. The intrinsic viscosity of the polymer in chloroform solution at 30° C. is 0.3 dl./g.

EXAMPLE 2

Following the procedural steps of Example 1, 0.01 mole of chromium(III) hydroxide is prepared, filtered and washed. It is transferred on its filter paper to a solution containing 3.12 g. $(CH_3)(C_6H_5)P(O)OH$ (0.2 mole) in 50 ml. of tetrahydrofuran and 50 ml. of $H_2O$. The mixture is heated to boiling with stirring, and the hydroxide slowly dissolves. After 15 minutes of boiling, an additional 50 ml. of tetrahydrofuran is added to the solution, and the solution is then boiled for another 5 minutes after which it is filtered to remove the filter paper. Evaporation of the solvent gives 3.8 g. or 95.7% yield of polymer composed of the repeating unit $$[Cr(H_2O)(OH)[OP(CH_3)(C_6H_5)O]_2]$$

This structure is confirmed by elemental and infrared spectrum analyses.

EXAMPLE 3

Chromium(III) hydroxide (0.01 mole) is prepared in the above manner and added to a mixture of 4.36 g. (0.02 mole) of $(C_6H_5)_2P(O)OH$ in 40 ml. of water and 60 ml. of tetrahydrofuran. Heating and stirring causes the reaction mixture to become a green solution which is filtered to remove the filter paper. Additional water (150 ml.) is added and boiling continued until all tetrahydrofuran solvent is removed. The precipitated polymer product is collected on a filter and dried in the air at room temperature to yield 5.05 g. (97%) of polymer composed of the recurring unit $$[Cr(H_2O)(OH)[OP(C_6H_5)_2O]_2]$$

The intrinsic viscosity of the polymer in chloroform solution at 30° C. is 0.04 dl./g.

EXAMPLE 4

Following the procedural steps of Example 3 a copolymer composed of the repeating unit $$[Cr(H_2O)(OH)[OP(CH_3)(C_6H_5)O][OP(C_8H_{17})_2O]$$

is prepared from the reaction of 0.01 mole of chromium(III) hydroxide and a mixture of 1.56 g. (0.01 mole) of $(CH_3)(C_6H_5)P(O)OH$ and 2.90 g. (0.01 mole) of $(C_8H_{17})_2PO)OH$ in 40 ml. of water and 60 ml. of tetrahydrofuran. The polymer product, after drying in the air at room temperature, is recovered in 98% yield.

We claim:
1. A method of preparing an inorganic polymer composed of the repeating unit $[CrH_2O)(OH)(OPR_1R_2O)_2]$ which comprises reacting in aqueous medium chromium(III) hydroxide with substituted phosphinic acid of the formula $R_1R_2P(O)OH$ where $R_1$ and $R_2$ are alkyl, aryl, alkoxy or aryloxy.
2. The method according to claim 1 wherein the aqueous reaction medium comprises a mixture of water and tetrahydrofuran.
3. The method according to claim 1 wherein $R_1$ and $R_2$ are each phenyl.
4. The method according to claim 1 where $R_1$ is methyl and $R_2$ is phenyl.
5. The method according to claim 1 wherein $R_1$ and $R_2$ are each octyl.

References Cited
UNITED STATES PATENTS

| | | | |
|---|---|---|---|
| 3,275,574 | 9/1966 | Saraceno | 260—2 P |
| 3,384,604 | 5/1968 | King | 260—2 P |
| 3,432,532 | 3/1969 | King | 260—2 P |
| 3,444,103 | 5/1969 | Maguire | 260—2 P |

SAMUEL H. BLECH, Primary Examiner